US008758022B2

(12) United States Patent  (10) Patent No.: US 8,758,022 B2
Kim  (45) Date of Patent: Jun. 24, 2014

(54) INSTRUCTIONAL TOOTHBRUSHING

(76) Inventor: Youngjoo Elaine Kim, New York, NY (US)

( * ) Notice: Subject to any disclaimer, the term of this patent is extended or adjusted under 35 U.S.C. 154(b) by 1088 days.

(21) Appl. No.: 11/355,705

(22) Filed: Feb. 16, 2006

(65) Prior Publication Data

US 2007/0190509 A1 Aug. 16, 2007

(51) Int. Cl.
G09B 19/00 (2006.01)
A46B 15/00 (2006.01)

(52) U.S. Cl.
CPC ........ G09B 19/0076 (2013.01); A46B 15/0006 (2013.01); A46B 15/0002 (2013.01); A46B 2200/1066 (2013.01); A46B 15/0042 (2013.01)
USPC ........................................................ 434/263

(58) Field of Classification Search
CPC .................................................. G09B 19/0084
USPC ........................................ 434/263; 15/167.1
See application file for complete search history.

(56) References Cited

U.S. PATENT DOCUMENTS

| 4,253,212 | A |   | 3/1981  | Fujita ........................ 15/167 R |
|-----------|---|---|---------|----------------------------------------|
| 5,044,037 | A | * | 9/1991  | Brown ............................ 15/105 |
| 5,133,102 | A |   | 7/1992  | Sakuma |
| 5,259,086 | A |   | 11/1993 | Fong |
| 5,438,726 | A |   | 8/1995  | Leite |
| 5,572,762 | A |   | 11/1996 | Scheiner |
| 5,673,451 | A |   | 10/1997 | Moore et al. |
| 5,786,749 | A |   | 7/1998  | Johnson et al. |
| 5,810,601 | A | * | 9/1998  | Williams ...................... 434/262 |
| 5,864,288 | A |   | 1/1999  | Hogan |
| 5,924,159 | A |   | 7/1999  | Haitin |
| 5,960,507 | A |   | 10/1999 | Dutra et al. |
| 6,115,477 | A |   | 9/2000  | Filo et al. |
| 6,154,912 | A |   | 12/2000 | Li |
| 6,199,239 | B1 |  | 3/2001  | Dickerson |
| 6,202,245 | B1 |  | 3/2001  | Khodadadi |
| 6,536,068 | B1 |  | 3/2003  | Yang et al. |
| 6,557,728 | B1 |  | 5/2003  | Anderson et al. |
| 6,779,215 | B2 |  | 8/2004  | Hartman et al. |
| 6,850,167 | B2 |  | 2/2005  | Rosen |
| 7,418,757 | B2 | * | 9/2008 | Gatzemeyer et al. ........... 15/105 |
| 2002/0058239 | A1 | * | 5/2002 | Wang ............................ 434/263 |
| 2003/0017874 | A1 |  | 1/2003 | Jianfei et al. |
| 2004/0000017 | A1 |  | 1/2004 | Kumagai |

(Continued)

FOREIGN PATENT DOCUMENTS

| CA | 2 232 528 A1 | 11/2000 |
| DE | 199 23 104 A1 | 11/2000 |
| DE | 100 45 067 A1 | 4/2002 |
| FR | 2822659 | 10/2002 |
| GB | 2252234 A | 8/1992 |

Primary Examiner — Kesha Frisby
(74) Attorney, Agent, or Firm — Marshall, Gerstein & Borun LLP

(57) ABSTRACT

An instructional hygiene method includes providing an instructional hygiene device, the instructional hygiene device configured to provide an instruction to a user during operation, and delivering said instruction from said instructional hygiene device to said user in response to activation of a user input of said instructional hygiene device. The instructional hygiene device can include a toothbrush or a dentifrice dispenser. The delivering an instruction step can include instructing the user regarding a tooth-brushing technique, instructing the user to move a toothbrush head in a circular motion, instructing the user to brush a tongue, and/or providing music to the user. In addition, the step of delivering the instruction can include retrieving the instruction from a memory of the instructional hygiene device.

23 Claims, 6 Drawing Sheets

(56) References Cited

U.S. PATENT DOCUMENTS

2005/0066461 A1   3/2005  Chang
2005/0136384 A1*  6/2005  Jarvis .......................... 434/263
2006/0008787 A1   1/2006  Hayman et al.
2006/0040246 A1*  2/2006  Ding et al. .................... 434/263
2008/0034515 A1*  2/2008  Hilscher et al. ................ 15/22.1

* cited by examiner

INSTRUCTIONAL TOOTHBRUSHING

BACKGROUND OF THE INVENTION

1. Field of the Invention

The invention relates in certain embodiments to instructional hygiene devices, including devices that provide an instruction to a user regarding operation and use of the device.

2. Description of the Related Art

Studies indicate that many people, especially children, do not properly employ commonly used hygiene devices, such as toothbrushes and dentifrices. To overcome this problem, some have employed musical entertainment devices and timers to motivate users to comply with well-established protocols. However, the usefulness of these devices is questionable at best, especially when used by pediatric users. Therefore, there still exists a need for an instructional hygiene device that provides an instruction to a user regarding proper device use and operation.

SUMMARY OF THE INVENTION

In one embodiment, an instructional hygiene method includes: providing an instructional hygiene device, said instructional hygiene device configured to provide an instruction to a user during operation; and delivering said instruction from said instructional hygiene device to said user in response to activation of a user input of said instructional hygiene device.

The instructional hygiene device can include a toothbrush or a dentifrice dispenser. The step of delivering an instruction can include instructing the user regarding a tooth-brushing technique, instructing the user to move a toothbrush head in a circular motion, instructing the user to brush a tongue, and/or providing music to the user. In addition, the step of delivering the instruction can include retrieving the instruction from a memory of the instructional hygiene device.

The method can further include determining a parameter of tooth brushing with the instructional hygiene device and activating an indicator in response to the parameter. The parameter can include the duration of tooth brushing. In addition, the step of delivering the instruction can include delivering the instruction for a predetermined duration, instructing the user to brush each quadrant of the mouth, instructing the user to brush a surface of the user's teeth, and/or emitting audible information through a membrane of said instructional hygiene device.

In another embodiment, an instructional toothbrush includes: a body portion adapted to be held by a user, said body portion comprising a distal end and a proximal end; a tooth-brushing head coupled to the distal end; and an instruction generator located within said body portion, wherein said instruction generator is configured to provide at least one instruction to the user during operation of the instructional toothbrush, wherein said instruction comprises information indicating predetermined, desired movement of said instructional toothbrush with respect to said user's mouth.

The instructional toothbrush can further include a sensor configured to sense a parameter of toothbrush operation. In one embodiment, the sensor is selected from the group consisting of a pressure sensor, a motion sensor, a switch, and a timer. The parameter of toothbrush operation can be selected from the group consisting of a tooth-brushing time, a tooth-brushing duration, a tooth-brushing frequency, a movement of said body portion, and a pressure applied to said tooth-brushing head. In addition, the instructional toothbrush can also include an indicator coupled to the body, wherein the indicator is configured to be activated based upon the parameter.

In yet another embodiment, an instructional toothbrush includes: a body portion adapted to be held by a user, said body portion comprising a distal end and a proximal end; a tooth-brushing head coupled to the distal end; and an instruction generator located within said body portion, wherein a position of the tooth-brushing head with respect to the user's mouth is adjusted based upon an instruction stored in said memory.

DETAILED DESCRIPTION OF THE PREFERRED EMBODIMENTS

Figure 1:
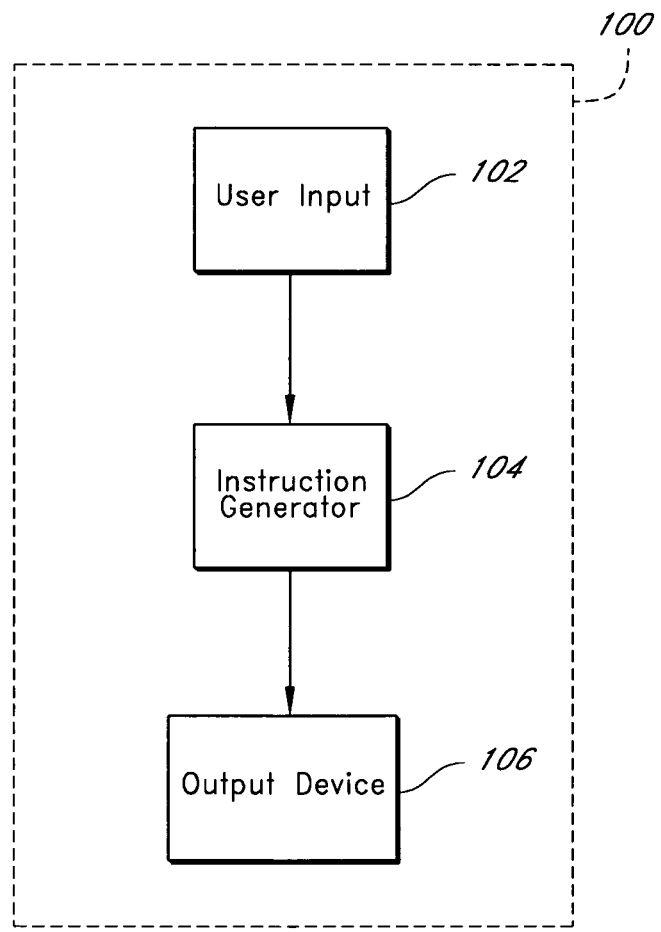
FIG. 1 is a block diagram of an instructional hygiene device in accordance with one embodiment of the present invention.

FIG. 1 illustrates a block diagram of an instructional hygiene device 100 in accordance with one embodiment of the present invention. The instructional hygiene device 100 includes a user input 102, an instruction generator 104, and an output device 106. The instructional hygiene device can be any device used by people for self-hygiene and/or grooming, for example, a toothbrush, a toothpaste container, a toothbrush holder, a dental floss dispenser, a cup, a mouthwash dispenser, a hairbrush, a soap dispenser or holder, or any other such device.

The user input 102 is any device that can be actuated by a user when using the instructional hygiene device 100. For example, the user input 102 can be a switch, knob, toggle, button, sensor, microphone, or any other such device. In one embodiment, the user input 102 is a push-button switch mounted to a toothbrush. In another embodiment, the user input 102 is a level switch that is activated when a toothbrush is picked up or moved by a user.

The instruction generator 104 is a device configured to provide an instruction to the user of the instructional hygiene device 100. For example, the instruction generator 104 can include a microprocessor, a timer, a memory, and/or a power supply. The instruction generator 104 can be coupled to a sensor that monitors use of the instructional hygiene device 100. In such cases, the instruction provided by the instruction generator 104 can be selected based upon a signal measured by the sensor. For example, the sensor of the instruction generator can be a gyroscopic sensor, such as disclosed by Yang, et al. in U.S. Pat. No. 6,536,068, which is incorporated by reference herein. Other sensors, such as motion sensors and pressure sensors, are taught in U.S. Pat. Nos. 5,673,451, 6,154,912, 6,850,167, and U.S. Publication Nos. 2004/0000017, 2004/0017874, 2005/0066461, all of which are incorporated by reference herein. Any other type of sensors, including an optical sensor, a level sensor, a rotation sensor, a tilt sensor, a timer, a switch, or any combination, can be used as well.

The output device 106 is configured to provide an instruction from the instruction generator 104 to the user. For example, the output device 106 can include an audio, a visual, or a combination audio-visual indicator. In some cases, the output device 106 includes a speaker, a light emitting diode (LED), a light source, and/or a display, such as an liquid crystal display (LCD). The output device 106 of the instructional hygiene device 100 can include an audio indicator, such as a speaker, as well as a visual indicator, such as one or more LEDs.

In some cases, the output device 106 includes LEDs of different colors, such as a green LED, a yellow LED, and a red LED. In other cases, the output device 106 includes a single LED or light source that can be controlled to display different colored lights depending upon a control signal. For example, the output device 106 can include a single light source that can display a green, yellow and/or red light.

During operation a user selects the instructional hygiene device 100 and activates the user input 102. In one embodiment, the user selects his toothbrush and presses the power button. The instructional hygiene device 100 is activated and generates an instruction to be provided to the user.

The instruction can be any instruction related to the use of the instructional hygiene device. In one embodiment, the instruction includes information regarding optimal or clinically proven tooth-brushing techniques. The instruction can also include sounds and music selected to motivate the user to activate the user input 102 and to use the instructional hygiene device 100 for a clinically recommended or predetermined treatment period.

For example, it is useful to provide the instruction in the form of a musical song to cause pediatric users to brush their teeth frequently and for an adequate duration. A musical instruction that persists for a predetermined time period helps assure that children brush both frequently and for a satisfactory duration.

In some cases, the instruction includes directing spoken or sung words to move the instructional hygiene device 100 in a circular, elliptical, or linear motion, or a combination. The instruction can instruct the user to move the instructional hygiene device up and down, back and forth, in circles, etc. The instruction can instruct the user to place the bristles against the tooth at or adjacent the gum line, perhaps inclined with respect to the tooth surface, and then to move them away from the gum line in a straight or circular motion.

The instruction can instruct the user which tooth, teeth, portion of the mouth, or quadrant, to be brushed for a predetermined time period. For example, the instruction can instruct the user to brush the buccal, lingual and occlusal surfaces (or outside, inside and biting surfaces) of the upper left, upper right, lower left, and lower right quadrants of the mouth for a predetermined time period. In some cases, the predetermined time period is about 10, 15, 20, 30 or 60 seconds. In other cases, the predetermined time period is at least 5 seconds or no more than 90 seconds. In one embodiment, the instruction directs the user to brush a surface (e.g., outside inside, and biting) of each quadrant for about 10 seconds per surface, or about 30 seconds per quadrant, or about 2 minutes in total. In addition, in one embodiment, the instruction indicates that the user should brush or clean her tongue. For example, after instructing the user to brush her teeth, the instruction instructs the user to brush her tongue.

Figure 2:
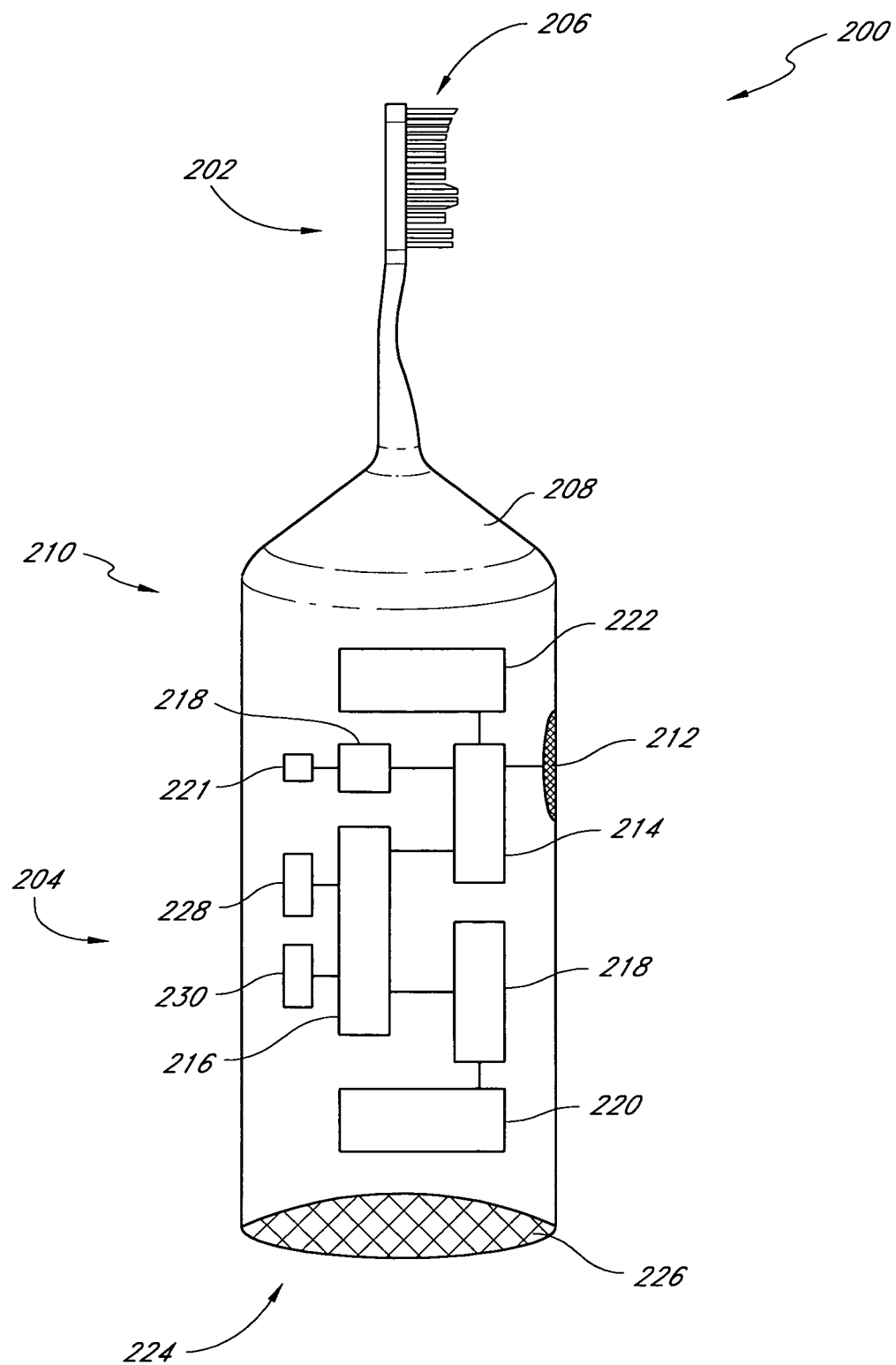
FIG. 2 is an instructional toothbrush embodiment of the instructional hygiene device of FIG. 1.

FIG. 2 illustrates one embodiment of the instructional hygiene device of FIG. 1 in the form of an instructional toothbrush 200. The instructional toothbrush 200 includes a head 202 coupled to a body 204. The head 202 includes bristles 206. The head 202 can be permanently or removably coupled to the distal end 210 of the body 204. When removably coupled to the body 204, a coupling 208 can be provided to allow removal and replacement of the head 202.

The body 204 includes a switch 212, a controller 214, a power supply 216, a driver 218 and a speaker 220. The switch 212 activates the instructional toothbrush 200 and allows power from the power supply 216 to be provided to the controller 214. The controller 214 is configured to retrieve an instruction from a memory 222, which can be part of the controller 214, or a separate component within the body 204.

The power supply 216 is any electrical energy storage device known to those of skill in the art. For example, in some embodiments, the power supply 216 includes a battery, such as an AA, AAA, or AAAA batter. The power supply 216 can include a rechargeable battery or a replaceable battery, or any other energy device, such as a capacitor, etc.

In some cases, the memory 222 is removably coupled to the body 204 of the instructional toothbrush 200. For example, the memory 222 can include a memory card that can be inserted into a slot of the body 204. Any such memory card can be used, including compact flash (CF), secured digital (SD), xD, Sony MEMORY STICK®, multi-media card (MMC), Toshiba SMARTFLASH®, or any other such memory card, many of which are well known to those of skill in the art.

The controller 214 can be any of a variety of electronic control devices, including logic, a microprocessor, a micro-controller (such as the Microchip PIC® microcontroller), a digital signal processor, and/or an embedded system. The controller 214 retrieves the instruction from memory 222 and formats it for delivery to the user. For example, the controller 214 can include digital-to-analog hardware to convert the instruction from memory 222 to an audio instruction signal. The audio instruction signal is provided to a driver 218 that conditions and/or amplifies the audio instruction signal prior to transmission to the speaker 220.

The speaker 220 provides an audible signal to the user that corresponds to the instruction retrieved from memory 222. In some cases, the audible signal provided to the user is referred to as the instruction. A visual indicator 221, such as an LED, can be coupled to the controller 214 via a driver 218 as well.

The speaker 220 can be provided in any of a variety of locations in the instructional toothbrush 200. For example, the speaker 220 can be provided at or near the proximal end 224 of the instructional toothbrush 200. The speaker 220 can be configured to direct sound along the central axis of the instructional toothbrush 200, or at an angle with respect to central axis. In some cases, the speaker 220 is configured to output sound from the side of the instructional toothbrush 200.

A membrane 226 is sometimes provided adjacent the speaker 220. The membrane 226 allows the transfer of sound from the speaker 220 to the user, but provides a barrier to water infiltration into the body 204 of the instructional toothbrush 200. The membrane 226 can include a water-resistant or water-proof membrane, and can be made from any of a variety of materials well known to those of skill in the art, including plastic, rubber, polymer, etc., and can be in the form of a mesh, a sheet, a plate, or any other suitable structure.

The instructional toothbrush 200 can operate according to the same principles described above with respect to FIG. 1. For example, when the user selects the instructional toothbrush 200 and presses the switch 212, the instructional toothbrush 200 is activated. The controller 214 retrieves a toothbrushing instruction from memory 222 and provides it to the user via the driver 218 and speaker 220. The instruction can be provided until the instruction ends, for example, about 5, 10, 15, 30, 60, 90 or 120 seconds. Alternatively, a timer can control when the instruction is no longer provided by the instructional toothbrush. For example, the controller 214 can repeatedly provide the instruction until the timer indicates that the desired time period has passed. The instruction can include any of the instructions described above with respect to FIG. 1.

The instructional toothbrush 200 can include a manual toothbrush or an automatic or powered toothbrush. In one embodiment, the instructional toothbrush 200 includes a motor or vibrator (not illustrated) to move and/or vibrate a portion of the instructional toothbrush 200. For example, the instructional toothbrush 200 can include a motor coupled to the bristles 206 of the head 202 of the instructional toothbrush 200 such that when activated, the motor causes the bristles 206 to move, spin, and/or rotate. In other cases, the motor causes the head 202 to move. In some other cases, the instructional toothbrush 200 includes a vibrator that causes the toothbrush bristles 206 to vibrate, for example, at sonic or ultrasonic frequencies.

The instructional toothbrush 200 can optionally include a sensor 228 or other input device to measure the quality and duration of the user's tooth-brushing activity. In some cases, the instruction provided by the instructional toothbrush 200 is adapted based upon the signal measured by the sensor 228. The sensor 228 can be any of the sensors described above with respect to FIG. 1. In some cases, the sensor 228 is or includes a motion sensor, a pressure sensor, an optical sensor, a timer, a switch, any other sensor, or a combination thereof.

The sensor 228 provides a signal to the controller 214 to indicate a parameter related to use of the instructional toothbrush 200. For example, if the user is applying too much or too little pressure to her teeth, if the user is moving the toothbrush too quickly or too slowly, or if the user is moving the toothbrush in an undesired pattern (for example, in a linear motion or a circular motion), the instructional toothbrush 200 can provide an appropriate instruction to the user to correct the user's behavior.

In addition, if the user is using the instructional toothbrush 200 in the proper manner, this behavior can be sensed by the instructional toothbrush 200, which can then provide an encouraging instruction to the user. For example, a special song, light sequence, animation, or awarding of "points" can be indicated. "Points" can be recorded and stored by the toothbrush (for example, in the memory 222) so a user (or the user's parents) can track progress.

In addition, the instruction provided to the user can include the activation of an indicator that reflects the quality of the user's tooth-brushing activity. For example, if the user uses the instructional toothbrush 200 in the proper manner (as sensed by the sensor 228) and/or for the proper duration (as can be determined, in one embodiment, by the user pressing the switch 212 to turn off the instructional toothbrush 200 prior to completion of the instruction), a green light source can be illuminated. If improper use is detected, a red light source can be illuminated. If intermediate quality and/or duration of use is detected, a yellow light source can be illuminated. Of course, these are merely examples and any similar output can be employed. Other methods of providing a tooth-brushing instructions is described below with respect to FIGS. 4 and 5.

In another embodiment, the instructional toothbrush 200 includes a communication device 230. The communication device 230 allows wired or wireless communication between the instructional toothbrush 200 and another device, such as a computing device and/or the Internet. For example, in one embodiment, the communication device 230 includes a radio-frequency receiver, transmitter, and/or transceiver for wireless communication. The communication device 230 can include hardware configured to communicate over a wireless network, or to establish a wireless link with another device, by any known wireless communication protocol. For example, in some cases, the communication device 230 includes a BLUETOOTH-compatible receiver, transmitter, and/or transceiver, although any other wireless communication protocol can be utilized, such as any of the IEEE 802.11 standards (including, but not limited to, 802.11(a), (b) or (g)) by the communication device 230.

The communication device 230 allows instructions to be uploaded from an electronic source (e.g., a database accessible via the Internet or other network or direct communications link) to the instructional toothbrush 200. For example, to change the instruction provided by the instructional toothbrush 200, the user can load a digital file corresponding to a new instruction via the communication device 230. In one embodiment, the user selects a desired instruction with a computer and wirelessly (or via wired link) uploads the instruction to the instructional toothbrush's memory 222. In some cases, the instruction of the instructional toothbrush 200 comprises a song or music, and the user loads a song or music into the instructional toothbrush 200 via the communication device 230.

The communication device 230 also allows information stored in the instructional toothbrush 200 to be downloaded by a user to a computing device. For example, the instructional toothbrush 200 can be configured to record the frequency and/or duration of use by a user, and that information can be transmitted to a computing device. Transfer of a data related to a user's brushing habits can be used to determine if the user is adequately brushing her teeth.

Figure 3:
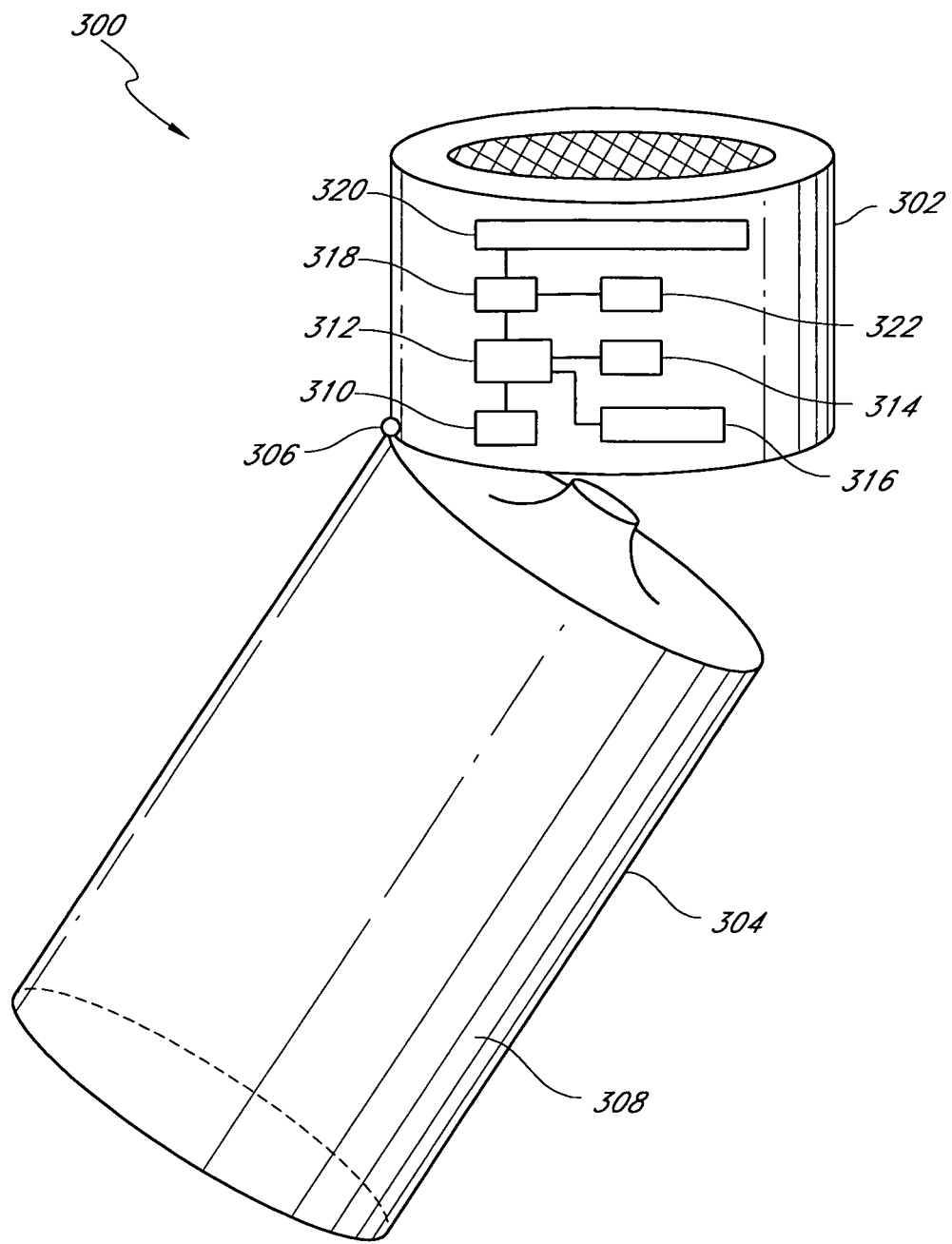
FIG. 3 is an instructional toothpaste dispensing assembly embodiment of the instructional hygiene device of FIG. 1.

FIG. 3 illustrates an embodiment of the instructional hygiene device of FIG. 1 in the form of a dentifrice dispensing assembly 300. The dentifrice dispensing assembly 300 can include any toothpaste tube and cap, including those taught by Anderson, et al. in U.S. Pat. No. 6,557,728, which is incorporated by reference herein.

The dentifrice dispensing assembly 300 includes a cap 302 coupled to a container 304 at a coupling 306. The container 304 can include a tube or bag, or any other suitable container 304. The coupling 306 can include a hinge, a pin, or joint, or any other suitable coupling, as are well known to those of skill in the art.

The container 304 is configured to contain a dentifrice 308, such as a toothpaste or toothgel. The dentifrice 308 can include a tooth-whitening compound adapted to whiten a user's teeth. It may be particularly useful to dispense a tooth-whitening compound from a dentifrice dispensing assembly 300 as described herein, since the safety and efficacy of tooth-whitening agents is often determined by their proper use and application. For example, some tooth-whitening compounds are effective at whitening teeth only if properly applied and left on the teeth for a predetermined time period. In addition, it is important that some tooth-whitening compounds are not applied to oral soft tissue, such as gum, cheek, lip or tongue, as damage to those tissues may occur. The dentifrice dispensing assembly 300 is particularly useful in that it can provide instruction to the user regarding proper application and use of tooth-whitening compounds.

The cap 302 of the dentifrice dispensing assembly 300 generally includes a switch 310 coupled to a controller 312. A power supply 314 provides power to the controller 312. The controller 312 retrieves an instruction from a memory 316 and provides a signal corresponding to the instruction to a driver 318 that drives a speaker 320. Sound from the speaker 320 can be directed through an optional membrane 324 in the cap 302. The components of the cap 302 of the dentifrice dispensing assembly 300 can be the same or equivalent to those described above with respect to the instructional toothbrush 200 of FIG. 2.

Figure 4:
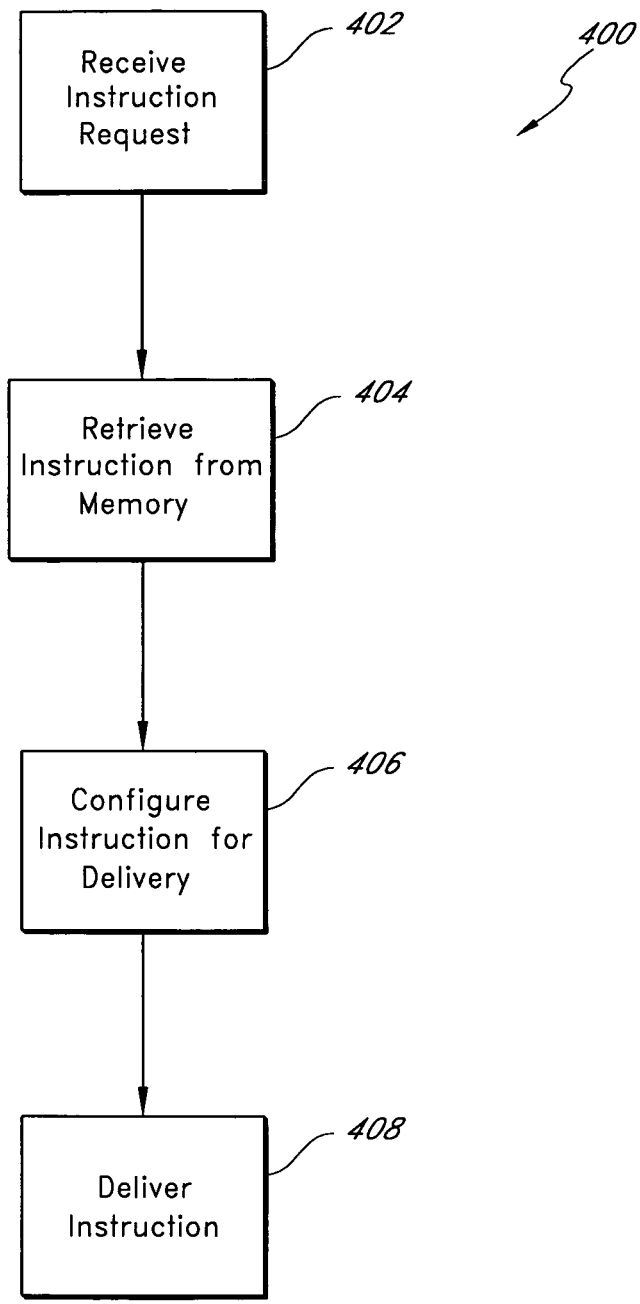
FIG. 4 is an instructional method that can be practiced with any of the devices of FIGS. 1-3.

FIG. 4 illustrates an instructional hygiene method that can be practiced with any of the devices described above. The method 400 begins at step 402. At step 402, in instruction request is received. For example, an instructional toothbrush can detect that its button has been pressed, or a dentifrice dispenser can detect that its lid has been opened via activation of its switch. Alternatively, an instructional toothbrush can detect that it has been picked up or that it is being used by a sensor or level switch located within it. At step 404, an instruction is retrieved from a memory. For example, a microcontroller of the instructional toothbrush can access memory and retrieve an instruction to be delivered to a user. At step 406, the instruction is configured for delivery. For example, a digital-to-analog converter can create an analog signal based upon the digital instruction stored in memory. The analog signal can be provided to a driver to generate a drive signal or drive signal instruction to a speaker. Finally, at step 408, the instruction is delivered. For example, the drive signal can be provided to and/or received by a speaker, which outputs an instruction, such as an audio signal corresponding to the drive signal.

Figure 5:
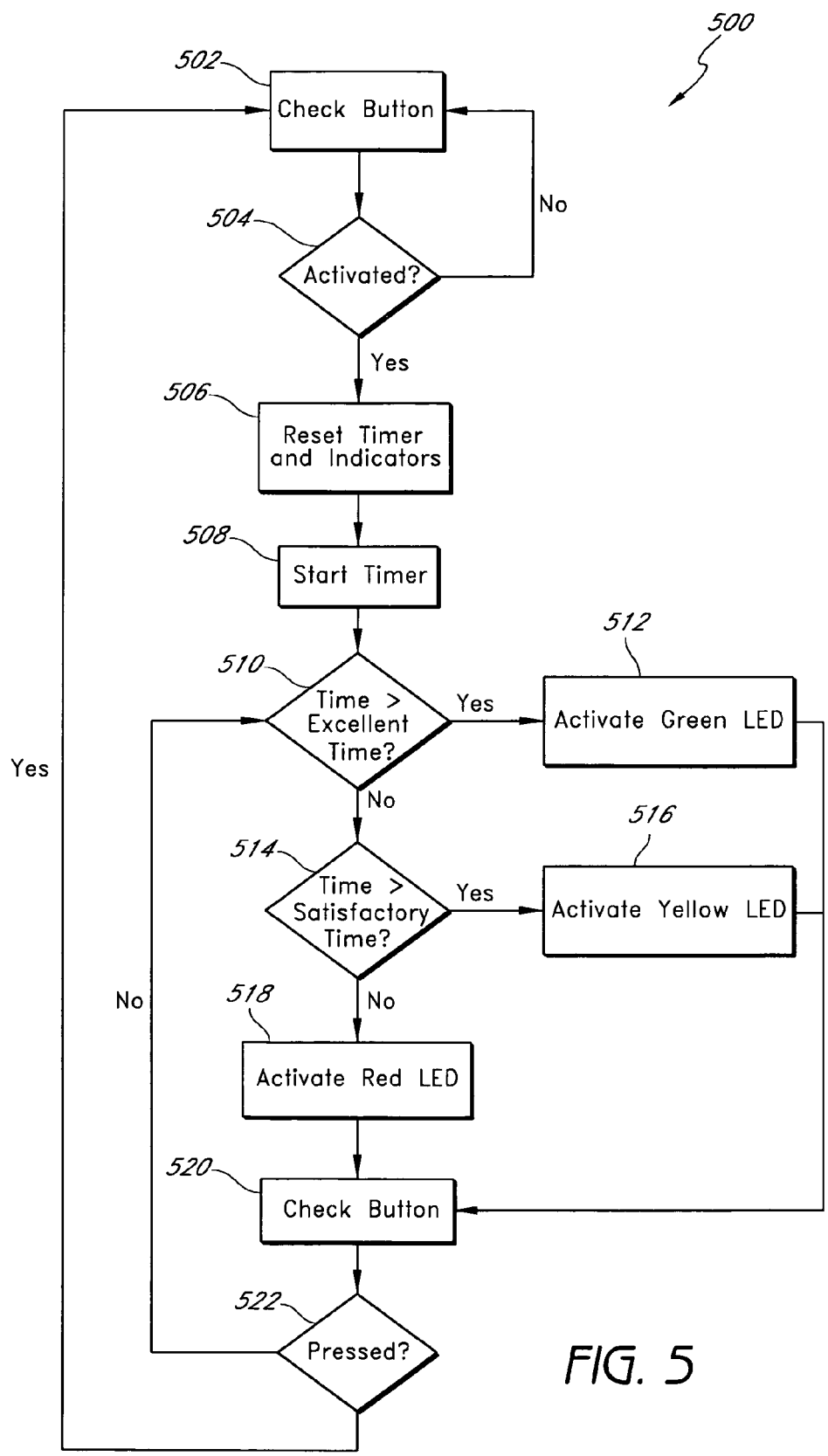
FIGS. 5 and 6 are instructional tooth-brushing methods that can be practiced with any of the devices of FIGS. 1-3.

FIG. 5 illustrates a tooth-brushing method in accordance with another embodiment of the present invention. The method 500 begins at step 502. At step 502 the method 500 checks the status of a button, user input, input device, or other action initiator, such as a switch, a lever, a sensor, or any other user input. At step 504, the method 500 determines if the button (or other monitored component) has been activated. For example, the method 500 can determine if the power button on an instructional toothbrush has been pressed, or if the switch of an instructional dentifrice cap has been activated. If the button has not been pressed, the method 500 returns to step 502. If the button has been pressed, the method continues to step 506.

At step 506 the method 500 resets a timer and indicators on the instructional device. For example, the method 500 can clear a variable stored in memory that keeps track of how much time the instructional device has been activated. In addition, the method 500 can reset indicators of the instructional device. For example, the method 500 can turn off any LEDs that may be illuminated. The method 500 then proceeds to step 508.

At step 508, the method 500 starts the timer. For example, the method 500 can begin recording the amount of time that the instructional device is activated, and store that time in a memory location.

At step 510, the method 500 determines if the time passed is greater than a threshold value corresponding to an "excellent amount of brushing" time. For example, the method 500 can determine if the user has been brushing his teeth, or if the timer has been activated, for at least about 30, 60, 90, 120, or 150 seconds. If so, the method 500 proceeds to step 512, where the method 500 turns on an indicator that corresponds to excellent brushing by the user. For example, at step 512, a green (or any other color) LED can be illuminated, or an LED can be set to flash or blink, or a sound or beep can be provided or emitted from the toothbrush. If not, the method 500 continues to step 514.

At step 514, the method 500 determines if the time passed is greater than a threshold value corresponding to a "satisfactory amount of brushing" time. For example, the method can determine if the user has been brushing his teeth, or if the timer has been activated, for between about 30 and 60 seconds, 60 and 90 seconds, 90 and 120 seconds, or 120 and 150 seconds. If so, the method 500 proceeds to step 516, where the method 500 turns on an indicator that corresponds to satisfactory, but not excellent brushing by the user. For example, at step 516, a yellow (or any other color) LED can be illuminated, or an LED can be set to flash or blink, or a sound or beep can be provided or emitted from the toothbrush. If not, the method 500 continues to step 518.

At step 518 the method 500 turns on an indicator that corresponds to unsatisfactory or poor brushing by the user. For example, at step 518, a red (or any other color) LED can be illuminated, or an LED can be set to flash or blink, or a sound or beep can be provided or emitted from the toothbrush.

After any one of steps 512, 516 or 520, the method 500 continues to step 520. At step 520, the method 500 checks the status of a button (or other user input), for example, as described above with respect to step 502. At step 522, the method 500 determines if the button was pressed. For example, the method 500 determines if a user input was activated in a similar manner as in step 504, described above. If the user input was not activated, the method 500 returns to step 510. If the user input was activated, the method 500 returns to step 502.

By employing the method 500 of FIG. 5, an instructional device, such as an instructional toothbrush, can provide feedback to a user regarding brushing duration. For example, an instructional toothbrush can include three LEDs: one red, one yellow, and one green. When the user turns on the instructional toothbrush, the red LED is illuminated. After a first period of time, the yellow LED is illuminated, and after a second period of time, the green LED is illuminated, as described above.

Figure 6:
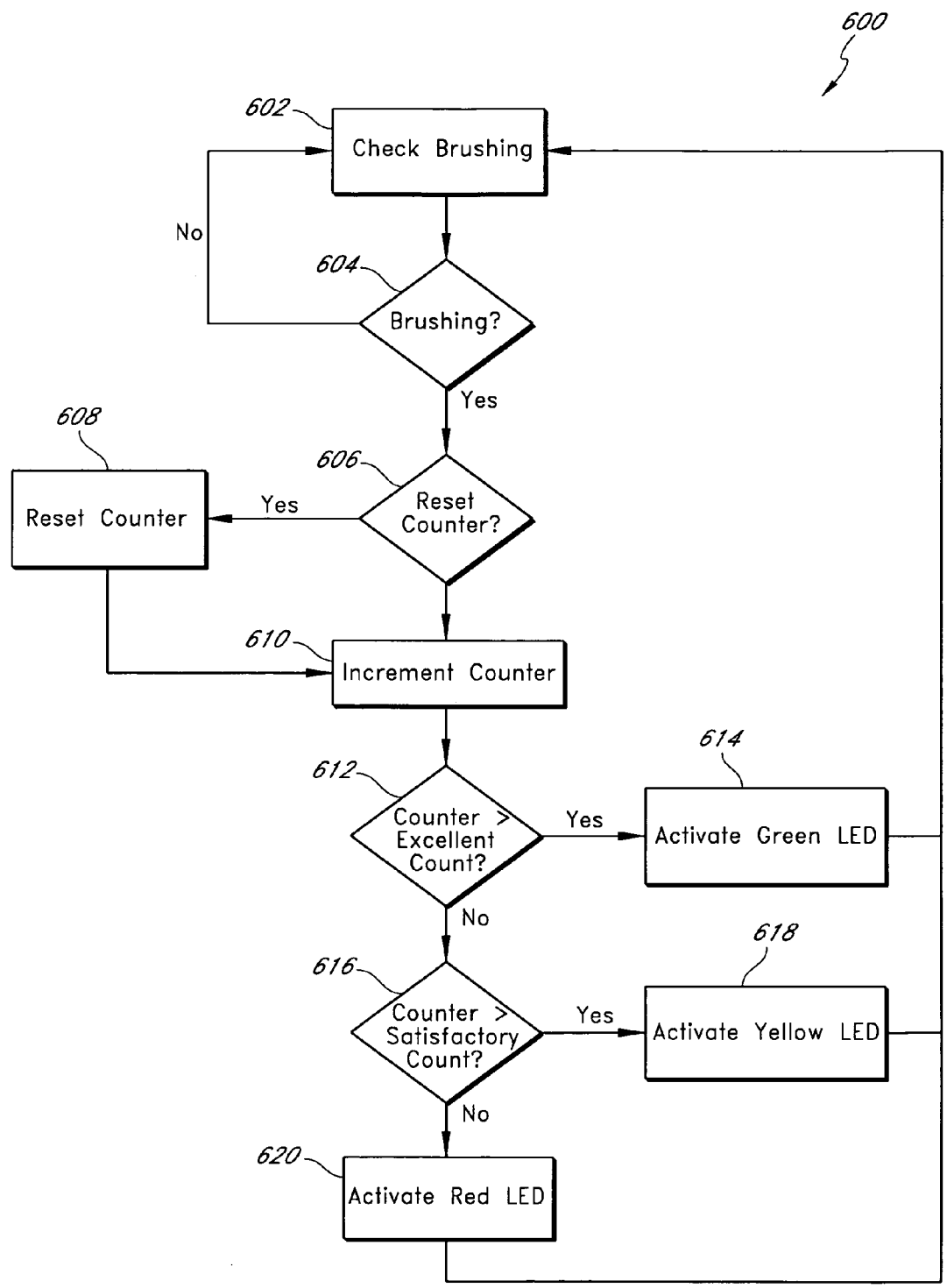

FIG. 6 illustrates another tooth-brushing method in accordance with another embodiment of the present invention. The method 600 begins at step 602. At step 602 the method 600 checks the status of a brushing sensor. For example, at step 602, the method 600 can determine if pressure is being applied to the bristles, head, neck, or body of an instructional toothbrush. Additionally, or alternatively, the method 600 can determine if the instructional toothbrush is being moved, for example, back and forth, or in a circular motion, or in a combination of motions. At step 604, the method 600 determines if the status indicates that the user is brushing her teeth. If not, the method 600 returns to step 602. If so, the method 600 continues to step 606.

At step 606, the method 600 determines if a counter is to be reset. For example, if a certain amount of time has passed since the instructional toothbrush determined that the user was brushing her teeth, the method 600 can conclude that the present activity is discontinuous with, or should not be counted as part of, any previously sensed brushing activity. For example, if the instructional toothbrush determines that tooth brushing has not occurred for more than about 30, 60, 90, 120, or 240 seconds, it the method 600 can reset the counter. If so, the method 600 continues to step 608, where the counter is reset. In one embodiment, a counter is reset by setting the value of a counter variable to zero. The method then continues to step 610. If at step 606 the method 606 determines that the counter should not be reset, the method continues to step 610. At step 610 the counter is incremented and the method 600 continues to step 612.

At step 612, the method 600 determines if the counter value is greater than a threshold value corresponding to "excellent tooth brushing." The counter value can correspond to the amount of time that the user has been brushing her teeth. If so, the method 600 continues to step 614, where an indicator corresponding to "excellent tooth brushing" is activated. For example, at step 614, a green (or any other color) LED can be illuminated, or an LED can be set to flash or blink, or a sound or beep can be provided or emitted from the toothbrush. If not, the method 600 continues to step 616.

At step 616, the method 600 determines if the counter value is greater than a threshold value corresponding to "satisfactory tooth brushing." If so, the method 600 continues to step 618, where an indicator corresponding to "satisfactory tooth brushing" is activated. For example, at step 618, a yellow (or any other color) LED can be illuminated, or an LED can be set to flash or blink, or a sound or beep can be provided or emitted from the toothbrush. If not, the method 600 continues to step 620.

At step 620, an indicator corresponding to "unsatisfactory tooth brushing" is activated. For example, at step 620, a red (or any other color) LED can be illuminated, or an LED can be set to flash or blink, or a sound or beep can be provided or emitted from the toothbrush. After any one of steps 614, 618, or 620, the method 600 returns to step 602.

Although this invention has been disclosed in the context of a certain preferred embodiment, it will be understood by those skilled in the art that the present invention extends beyond the specifically disclosed embodiment to other alternative embodiments and/or uses of the invention and obvious modifications and equivalents thereof. In particular, while the present instructional toothbrush and methods have been described in the context of a particularly preferred embodiment, the skilled artisan will appreciate, in view of the present disclosure, that certain advantages, features and aspects of the information communication system, device, and method may be realized in a variety of other applications and software systems. Additionally, it is contemplated that various aspects and features of the invention described can be practiced separately, combined together, or substituted for one another, and that a variety of combination and subcombinations of the features and aspects can be made and still fall within the scope of the invention. Thus, it is intended that the scope of the present invention herein disclosed should not be limited by the particular disclosed embodiment described above, but should be determined only by a fair reading of the claims that follow.

What is claimed is:

1. An instructional hygiene method for a user performing tooth-brushing of teeth in the user's own mouth, the method comprising:
   activating a switch of an instructional toothbrush, the toothbrush comprising:
   a memory device configured to store therein instructions for instructing the user to move the toothbrush in a particular manner with respect to the user's own mouth and further configured to store therein one or more threshold values corresponding to a quality of tooth-brushing activity;
   a speaker for outputting the instructions;
   a controller configured to retrieve instructions stored in the memory device for reproduction over the speaker;
   one or more sensors configured to measure the quality of tooth-brushing activity by the user within the user's own mouth including measuring a tooth brushing frequency and a movement of a body portion of the toothbrush; and
   a wireless communication device operatively coupled to the memory device;
   receiving, using the wireless communication device, additional instructions from a remote computing device and storing said additional instructions in the memory device;
   measuring the quality of tooth-brushing activity by the user within the user's own mouth, wherein said quality is based, at least in part, on a tooth-brushing frequency, a movement of the instructional toothbrush relative to the user's own mouth, a location of at least a portion of the instructional toothbrush with respect to the user's own mouth, or combinations thereof;
   transmitting, using the wireless communication device, the quality of tooth-brushing activity to the remote computing device;
   outputting through the speaker first audible instructions including one or more instructions retrieved from the memory device;
   storing one or more variables in the memory device, wherein each variable is associated with at least one of the one or more threshold values corresponding to the quality of tooth-brushing activity;
   determining, based on whether the one or more variables stored in the memory device meets the one or more associated threshold values, whether an instruction is needed to correct one or more incorrect brushing behaviors of the user;
   wherein, if it is determined that at least one of the variables stored in the memory device does not meet at least one of the threshold values, selecting second audible instructions from the memory device based at least partly on the measurements obtained by the one or more sensors, the variable stored in the memory and the one or more associated threshold values, the second audible instructions comprising correction instructions for correcting the user's tooth-brushing activity within the user's own mouth, wherein the second audible instructions are selected to correct one or more incorrect brushing behaviors of the user including moving the toothbrush too quickly, moving the toothbrush too slowly, applying too much pressure, applying too little pressure, moving the toothbrush in an incorrect pattern, or combinations thereof; and
   outputting the second audible instructions to the user through the speaker.

2. The method of claim 1, wherein in outputting through the speaker first audible instructions including one or more instructions retrieved from the memory device, one of the one or more instructions comprises an instruction to the user to brush the user's tongue.

3. The method of claim 1, wherein said measuring the quality of tooth-brushing activity includes determining a parameter of tooth-brushing with said toothbrush and activating an indicator in response to said parameter.

4. The method of claim 1, wherein in outputting through the speaker first audible instructions, one of the one or more instructions comprises an instruction to the user to brush each quadrant of the mouth.

5. The method of claim 1, wherein in outputting through the speaker first audible instructions, one of the one or more instructions comprises an instruction to the user to brush a surface of the user's teeth.

6. The method of claim 1, further comprising storing information relating to the quality of tooth-brushing activity by the user within the user's own mouth.

7. The method of claim 1, wherein said outputting through the speaker first audible instructions and outputting said outputting the second audible instructions includes providing the first audible instructions and second audible instructions as song.

8. The method of claim 1, wherein in selecting the second audible instructions from the memory device based at least partly on the measurements obtained by the one or more sensors, the variable stored in memory and the one or more associated threshold values, the second audible instructions comprising correction instructions for correcting the user's tooth-brushing activity, wherein the second audible instructions are selected to correct at least two of the incorrect brushing behaviors of the user.

9. An instructional toothbrush comprising:
a body portion adapted to be held by a user, said body portion comprising a distal end configured for coupling a tooth-brushing head thereto and a proximal end, said body portion further comprising:
a speaker located at least partially within the body portion;
a sensor located at least partially within the body portion configured to measure a quality of the user's tooth-brushing activity with respect to the user's own mouth including one or more of the following: a tooth-brushing frequency, a movement of said body portion relative to the user's own mouth, or a location of at least a portion of said body portion relative to the user's own mouth;
a memory device located at least partially within the body portion configured to store instructions for instructing the user to move said instructional toothbrush in a particular manner with respect to the user's own mouth, one or more threshold values corresponding to the quality of tooth-brushing activity, and one or more variables, wherein each variable is associated with at least one of the one or more threshold values corresponding to the quality of tooth-brushing activity;
a communication device located at least partially within the body portion configured to wirelessly receive one or more instructions from a remote computing device for storing said one or more instructions in the memory device, wherein the communication device is further configured to transmit the quality of tooth-brushing activity to the remote computing device; and
an instruction generator located at least partially within said body portion, wherein said instruction generator is configured to:
output through the speaker first audible instructions including one or more instructions retrieved from the memory device;
determine, based on whether the one or more variables stored in the memory device meets the one or more associated threshold values, whether an instruction is needed to correct one or more incorrect brushing behaviors of the user;
wherein, if it is determined that at least one of the variables stored in the memory device does not meet at least one of the threshold values, select second audible instructions from the memory device based at least partly on the measurements obtained by the one or more sensors, the variable stored in memory and the one or more associated threshold values, the second audible instructions comprising correction instructions for correcting the user's tooth-brushing activity, wherein the second audible instructions are selected to correct one or more incorrect brushing behaviors of the user including moving the toothbrush too quickly, moving the toothbrush too slowly, applying too much pressure, applying too little pressure, moving the toothbrush in an incorrect pattern, or combinations thereof; and
outputting the second audible instructions through the speaker.

10. The instructional toothbrush of claim 9, wherein said sensor is selected from the group consisting of a pressure sensor, a motion sensor, a switch, and a timer.

11. The instructional toothbrush of claim 9, wherein the sensor is further operative to measure a pressure applied to said tooth-brushing head.

12. The instructional toothbrush of claim 9, wherein the instruction generator is further configured to provide encouragement to the user by generating a light sequence, an animation, and an awarding of points, or combinations thereof.

13. The instructional toothbrush of claim 12, wherein the memory is further configured to store the points in the memory device, thereby enabling the user to track tooth brushing progress.

14. The instructional toothbrush of claim 9, wherein the communication device comprises a wireless transceiver configured to transmit information regarding the user's brushing habits.

15. The instructional toothbrush of claim 14, wherein the information regarding the user's brushing habits comprises data regarding one or more of the frequency and duration of use of the toothbrush by the user.

16. The instructional toothbrush of claim 14, wherein the communication device is further configured to allow the information to be downloaded by the user to a computing device to facilitate determining whether the user is adequately brushing the user's teeth.

17. The instructional toothbrush of claim 9, wherein the communication device is further configured to allow a new instruction to be uploaded from the Internet to the instructional toothbrush.

18. The instructional toothbrush of claim 9, wherein the communication device includes a BLUETOOTH-compatible receiver, transmitter, transceiver, or combinations thereof.

19. The instructional toothbrush of claim 9, wherein the memory is removably coupled to the body portion.

20. The instructional toothbrush of claim 9, wherein the first audible instructions include two or more of the following: move the toothbrush in a circular motion, brush the inside surface of the teeth, brush the outside surface of the teeth, brush the biting surface of the teeth, brush the upper left area of the teeth, brush the lower left area of the teeth, brush the upper right area of the teeth, and brush the lower left area of the teeth.

21. The instructional toothbrush of claim 9, wherein the first audible, the second audible instructions, or both, are delivered as a song.

22. The instructional toothbrush of claim 9, further comprising the tooth-brushing head.

23. The instructional toothbrush of claim 9, wherein the second audible instructions are selected to correct at least two of the incorrect brushing behaviors of the user.

* * * * *